(12) United States Patent
Baker et al.

(10) Patent No.: US 8,134,929 B2
(45) Date of Patent: Mar. 13, 2012

(54) COMMUNICATION SYSTEM

(75) Inventors: Matthew P. J. Baker, Canterbury (GB); Timothy J. Moulsley, Caterham (GB)

(73) Assignees: Koninklijke Philips Electronics, N.V., Eindhoven (NL); Sharp Corporation, Osaka (JP)

( * ) Notice: Subject to any disclaimer, the term of this patent is extended or adjusted under 35 U.S.C. 154(b) by 873 days.

(21) Appl. No.: 10/555,018

(22) PCT Filed: Apr. 20, 2004

(86) PCT No.: PCT/IB2004/001324
§ 371 (c)(1),
(2), (4) Date: Oct. 31, 2005

(87) PCT Pub. No.: WO2004/100394
PCT Pub. Date: Nov. 18, 2004

(65) Prior Publication Data
US 2006/0209703 A1    Sep. 21, 2006

(30) Foreign Application Priority Data
May 3, 2003  (GB) .................................. 0310289.4

(51) Int. Cl.
*H04L 12/28* (2006.01)
(52) U.S. Cl. ......... 370/252; 370/332; 370/437; 455/522
(58) Field of Classification Search .................. 370/252, 370/338, 337, 350, 320, 321; 455/522, 456, 455/450, 62
See application file for complete search history.

(56) References Cited

U.S. PATENT DOCUMENTS

| | | | |
|---|---|---|---|
| 5,657,325 A | 8/1997 | Lou et al. | |
| 5,909,434 A | 6/1999 | Odenwalder et al. | |
| 6,341,214 B2 * | 1/2002 | Uesugi | 455/69 |
| 6,529,482 B1 | 3/2003 | Lundby | |
| 6,625,172 B2 * | 9/2003 | Odenwalder et al. | 370/474 |
| 2001/0000168 A1 | 4/2001 | Esmailzadeh et al. | |
| 2001/0014612 A1 | 8/2001 | Uesugi | |
| 2001/0037485 A1 | 11/2001 | Zhang | |
| 2002/0079865 A1 * | 6/2002 | Thomas et al. | 320/136 |
| 2002/0159410 A1 | 10/2002 | Odenwalder et al. | |
| 2002/0168993 A1 * | 11/2002 | Choi et al. | 455/522 |
| 2003/0058821 A1 | 3/2003 | Lee et al. | |
| 2003/0179830 A1 * | 9/2003 | Eidson et al. | 375/296 |

(Continued)

FOREIGN PATENT DOCUMENTS
DE    19813507 A1    9/1999
(Continued)

OTHER PUBLICATIONS

T. Socolofsky et al Request for Comments 1180 A TCP/IP Tutorial, Jan. 1991.*

*Primary Examiner* — Seema S Rao
*Assistant Examiner* — Henry Baron (57) ABSTRACT

In a communication system subject to variations in channel quality, transmit power control is used to reduce the variations in received signal quality. If the channel quality degrades to such an extent that a high transmit power would be required to ensure good received signal quality, the transmit power is decreased and is not increased until the channel quality recovers sufficiently to enable an acceptable transmit power level to be used. While the power is at the decreased level, transmission of a data block may continue, or may be suspended, with the data block being truncated if the whole block has not been transmitted by the end of the time period available for transmission of the data block.

42 Claims, 4 Drawing Sheets

U.S. PATENT DOCUMENTS

2006/0245397 A1 * 11/2006 Zhang .......................... 370/335

FOREIGN PATENT DOCUMENTS

| | | |
|---|---|---|
| DE | 19813507 C2 | 9/1999 |
| EP | 1067706 A1 | 1/2001 |
| JP | 10215219 A | 11/1998 |
| JP | 2001285193 A | 10/2001 |
| JP | 2003511892 A | 3/2003 |
| WO | 0101609 A1 | 1/2001 |
| WO | 0103328 A1 | 1/2001 |
| WO | 0105059 A1 | 1/2001 |
| WO | 0126246 A1 | 4/2001 |
| WO | 2004100394 A1 | 11/2004 |

* cited by examiner

COMMUNICATION SYSTEM

The invention relates to a method of operating a communication system and to radio stations for use in such a system.

Various mobile communications systems use transmitter power control (TPC) to adapt transmitted power level to the prevailing channel conditions. The objective of TPC schemes is to maintain an adequate received signal quality despite variations in the channel conditions due to propagation distance, obstructions, or fades caused by multipath reception. If the channel quality degrades, thereby causing the received signal quality to degrade, the is transmitter power level is increased to compensate, and when the channel quality recovers, the transmitter power level is decreased. Transmitter power control can operate in either open-loop or closed-loop form.

In open-loop power control schemes, a transceiver station measures received signal quality, estimates the attenuation occurring in the receive path, and adjusts its transmitter power on the assumption that the attenuation in the transmit path will be the same as on the receive path. An open-loop power control scheme generally requires the transmit and receive paths to use the same or similar frequency bands so that the attenuation is reciprocal. Such a power control scheme is well suited to time division duplex systems.

In closed-loop power control schemes, a second transceiver station measures the quality of a signal received from a first transceiver station and then issues TPC commands to the first transceiver station to either raise or lower its transmit power as appropriate. In this case no assumption of reciprocity is required, so a closed-loop power control scheme is suitable for frequency division duplex systems as well as for time division duplex systems. Typically the measurement of signal quality is made on a pilot signal transmitted in multiplex with the desired information signal. The TPC commands may be binary ones and zeros corresponding respectively to "increase" and "decrease" transmit power.

Figure 2:
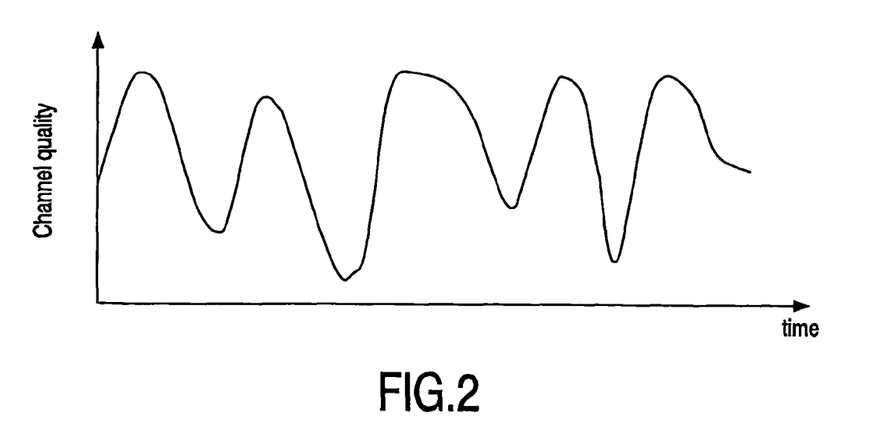
FIG. 2 is a graph illustrating variation of channel quality as a function of time.
Figure 3:
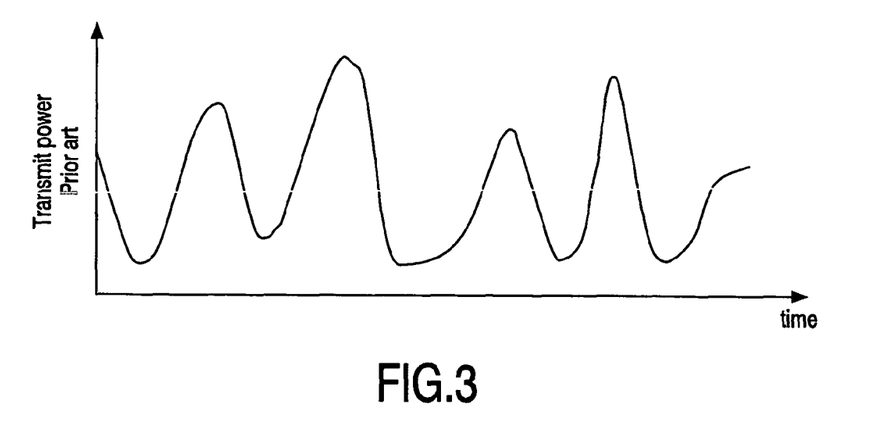
FIG. 3 is a graph illustrating variation in transmit power as a function of time according to known schemes of transmit power control.

FIG. 2 is a graph illustrating the variation in channel quality as a function of time without any transmit power control, and FIG. 3 is a graph illustrating the corresponding inverse variation in transmit power that would be provided by a perfect TPC scheme to maintain a constant signal quality. Due to practical constraints, such as a finite delay between the signal quality measurement and the issue of a TPC command, and between receipt of a TPC command and adjustment of transmit power, the transmit power does not track perfectly the variations in channel conditions and so the signal quality is not maintained perfectly constant. The present invention is applicable whether the tracking is perfect or imperfect; in the present specification and accompanying drawings perfect tracking is assumed for clarity.

One problem with the TPC schemes described above is that power consumption of the transmitter increases when channel conditions are poor, and therefore the schemes may not be power efficient. Another problem is that the increase in transmitted power increases the interference to other users, which can degrade system efficiency.

An object of the invention is to contribute to improved efficiency.

According to a first aspect of the invention there is provided a radio station comprising transmitter means for transmitting over a channel in a predetermined time period a data block comprising information symbols and parity check symbols and control means responsive to an indication of a reduction in channel quality according to a first criterion for decreasing the data transmit power and responsive to an indication within the predetermined time period of an increase in channel quality according to a second criterion for increasing the data transmit power.

By decreasing the data transmit power while the channel quality is poor, power is saved and interference is reduced.

The data block may be transmitted on one data signal or on a plurality of data signals simultaneously, and the decrease and increase in data transmit power may comprise decreasing and increasing the transmit power of one or more data signals. If a plurality of data signals is used, they may be transmitted on a plurality of carrier frequencies, or use Code Division Multiple Access (COMA).

Between the times of the first and second criteria being met, transmission of the data block may either be suspended or continue at a lower power level, possibly with a reduced data rate.

Transmission of a control signal, such as a pilot signal, may continue between the time of the first and second criteria being met.

If transmission of the data block is suspended when the first criterion is met, then when the second criterion is met, transmission of the data block may resume either from the point of suspension, or from the point in the data block that would have been reached had the transmission not been suspended, or from some point in between.

According to a second aspect of the invention there is provided a radio station for use in a radio communication system comprising at least one radio station in accordance with the first aspect of the invention, comprising quality assessment means for assessing the quality of received signals, means for determining whether transmission of a data block is in progress or suspended, and transmitter means for transmitting a first indication of received signal quality while transmission of the data block is in progress and for transmitting a second indication of received signal quality while transmission of the data block is suspended.

Thus, while the radio station in accordance with the first aspect of the invention is operating with decreased transmit power, the radio station according to the second aspect may continue to transmit some form of indication of received signal quality to assist the other station to determine when the second criterion is met.

The first and second indications of received signal quality may comprise different metrics and/or different update rates. For example, the first indication may be a TPC command, and the second indication may be a signal quality measurement.

According to a third aspect of the invention there is provided a method of operating a radio communication system, comprising, at a first radio station, transmitting over a channel in a predetermined time period to a second radio station a data block comprising information symbols and parity check symbols, and, in response to an indication of a reduction in channel quality according to a first criterion, decreasing the data transmit power and, in response to an indication within the predetermined time period of increase in channel quality according to a second criterion, increasing the data transmit power.

According to a fourth aspect of the invention there is provided a radio communication system comprising at least one radio station in accordance with the first aspect of the invention.

The invention will now be described, by way of example only, with reference to the accompanying drawings wherein.

Figure 1:
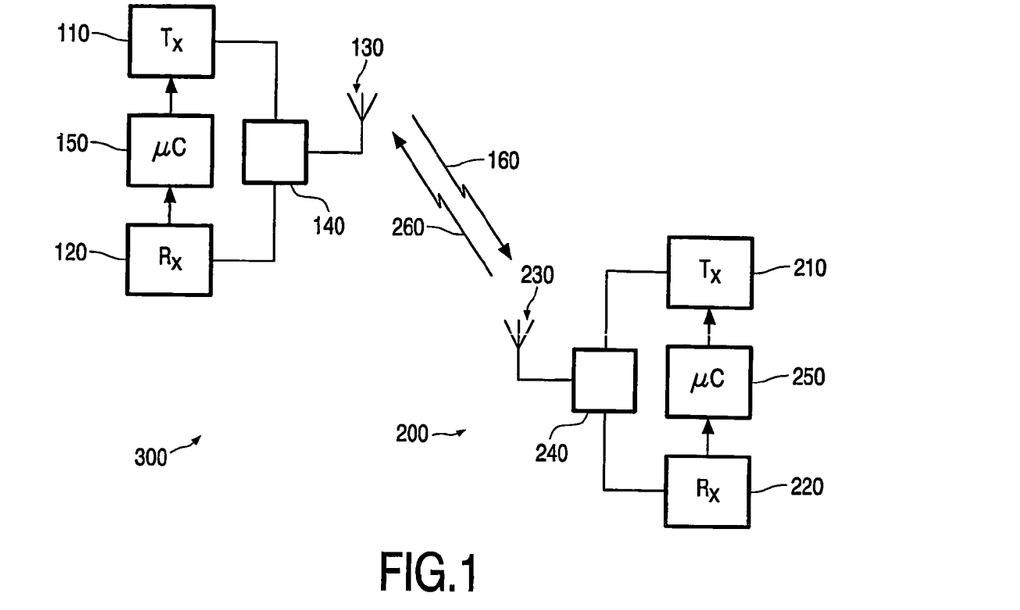
FIG. 1 is block schematic of a radio communication system.

Referring to FIG. 1 there is shown a radio communication system 300 comprising a first radio station 100 and a second radio station 200. One of the first and second radio stations 100, 200 may be, for example, a portable telephone and the other a base station in a mobile phone network. The radio system 300 may comprise a plurality of the first radio stations 100 and/or the second radio stations 200. The first radio station 100 comprises a transmitter means 110 and a receiving means 120. An output of the transmitter means 110 and an input of the receiving means 120 are coupled to an antenna 130 by a coupling means 140, which may be for example a circulator or a changeover switch. Coupled to the transmitter means 110 and receiving means 120 is a control means 150, which may be for example a processor. The second radio station 200 comprises a transmitter means 210 and a receiving means 220. An output of the transmitter means 210 and an input of the receiving means 220 are coupled to an antenna 230 by a coupling means 240, which may be for example a circulator or a changeover switch. Coupled to the transmitter means 210 and receiving means 220 is a control means 250, which may be for example a processor. Transmission from the first radio station 100 to the second radio station 200 takes place on a first channel 160 and transmission from the second radio station 200 to the first radio station 100 takes place on a second channel 260. In the following description it is assumed that the transmissions use spread spectrum techniques such that signals are spread using a spreading code, and data and control signals may be transmitted simultaneously with different spreading codes. However, such an assumption is not essential to the invention.

Figure 5A:
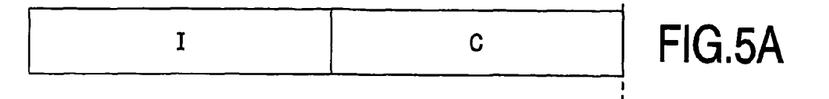
FIG. 5 illustrates various scenarios of transmission of a data block in accordance with the invention.

Referring to FIG. 5A there is illustrated a data block comprising information symbols I and parity check symbols C. The information symbols I and parity check symbols C are illustrated segregated into separate portions, but they may be to some extent interleaved. As a numerical example, the period of time $t_F$ available for transmitting the data block may be 10 ms and accommodate 200 bits of which 100 are information bits/and 100 are parity check bits C. The information and parity check bits may be segregated as illustrated in FIG. 5A, or for example 50 of the parity check bits may be interleaved with the information bits and the remaining 50 parity check bits transmitted after the information bits have all been transmitted.

The data block is transmitted by the transmitting means 110 of the first radio station 100 in a predetermined time period of duration $t_F$. This time period may be part of a frame structure comprising a plurality of such time periods. While the data block is being transmitted the receiving means 120 of the first radio station receives a signal from the second radio station 200 on the second channel 260. A form of either open-loop or closed-loop power control is used.

If open-loop power control is used, receiving means 120 monitors the quality of a signal received on the second channel 260 and the control means 150 adjusts the transmit power of the transmitter means 110 in response to quality changes.

If closed-loop power control is used, the receiving means 220 of the second radio station 200 monitors the quality of the received signal and the control means 250 generates TPC commands which are transmitted on the second channel 260 by the transmitter means 210 to the first radio station 100. The first radio station 100 may also transmit a control signal as a pilot signal on the first channel 160 to assist the receiving means 220 of the second radio station 200 in monitoring the quality of the received signal.

Figure 4:
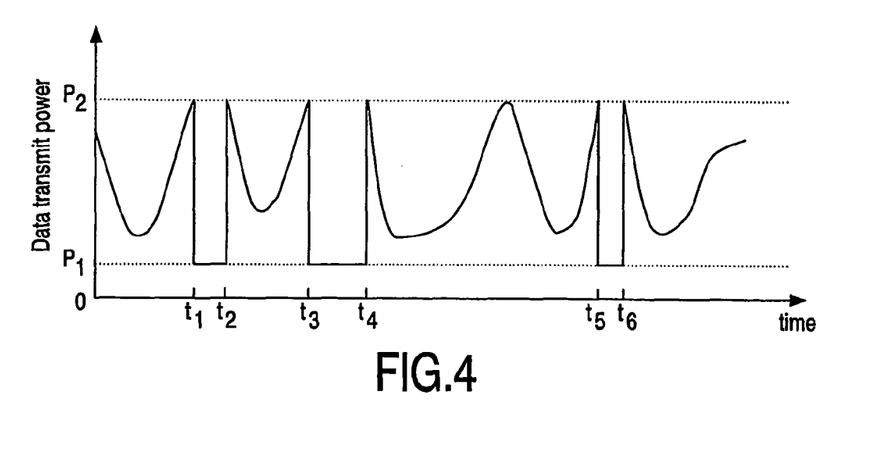
FIG. 4 is a graph illustrating variation in transmit power as a function of time according to the invention.

While the data block is being transmitted the quality of the first channel 160 varies as illustrated in FIG. 2. The power control scheme causes the transmit power of the transmitting means 110 to vary but only to a limited extent. If the quality of the first channel 160 degrades to an extent determined by a first criterion, the control means 150, instead of, as in known schemes, increasing the transmit power of the transmitting means 110 above a level denoted $P_2$ in FIG. 4 in an attempt to restore the received signal quality, according to the invention decreases the transmit power of the data to a level $P_1$. When the control means 150 determines that the channel quality has subsequently increased to an extent determined by a second criterion, the control means 150 increases the transmit power of the data. In FIG. 4, the decrease to a transmit power level $P_1$ takes place at times $t_1$, $t_3$, and $t_5$ and the increase in transmit power takes place at times $t_2$, $t_4$, and $t_6$.

The first criterion, for determining when the data transmit power decrease to level $P_1$ occurs, may take one of many forms. Some examples are:

a) the quality of the first channel 160, as indicated by a transmitted message on the second channel 260 or by a measurement of the quality of a signal received on the second channel 260, falls to or below a predetermined level;

b) the transmit power reaches, or would otherwise exceed, a predetermined transmit power level $P_2$;

c) the short term mean channel quality, as indicated by a transmitted message on the second channel 260 or by a measurement of the quality of a signal received on the second channel 260, falls to or below a predetermined level;

d) the short term mean transmit power reaches, or would otherwise exceed, a predetermined level $P_2$;

e) receipt of a TPC command which, if obeyed, would increase transmit power or short term mean transmit power above a predetermined transmit power level $P_2$.

The power level $P_2$ may be predetermined, or may be a function of the transmit power of a control signal, for example $P_2 = P_2' - P_{ctrl}$, where $P_2'$ is predetermined and $P_{ctrl}$ is the current transmit power of the control signal.

The reduced level $P_1$ may be zero power, in which case the transmitter means 110 may be switched off. Also, the reduced power level $P_1$ need not be a single predetermined level, but may vary during the predetermined time period.

There are several options for operation of the first radio station 100 between the time when the data transmit power is decreased and the time when the data transmit power is increased. During operation of the first radio station 100 after decreasing the data transmit power following the first criterion being met and before the second criterion is met, the transmission of data may be either a) switched off, or
b) continued at a reduced and constant level, or
c) continued at a reduced and varying level, to some extent tracking variations in channel quality.

If the data is transmitted at a non-zero level, it may also be transmitted at a reduced data rate.

The first radio station 100 may transmit a plurality of data signals simultaneously. The power levels $P_2$ and $P_1$ may relate to the transmit power of one of the data signals or to the total combined transmit power of a plurality of the data signals. If the power levels $P_2$ and $P_1$ relate to the transmit power of one data signal, the reduction in transmit power is effected by reducing the transmit power of that data signal. If the power levels $P_2$ and $P_1$ relate to the total combined transmit power of a plurality of data signals, the reduction in transmit power may be effected by reducing the transmit power level of one or more of the data signals, for example the highest-powered data signal or signals, or by reducing the transmit power level of all of the data signals.

Figure 7:
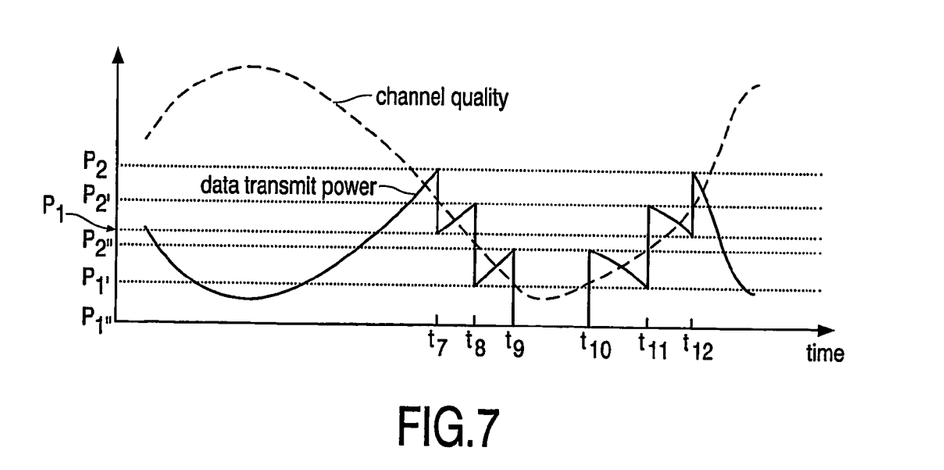
FIG. 7 is a graph illustrating variation in transmit power as a function of time according to the invention for three data signals transmitted simultaneously.

The first criterion may also be applied a plurality of times during the predetermined time period. For example, the first radio station 100 may transmit three data signals simultaneously, with the power levels $P_2$ and $P_1$ relating to the total combined transmit power of the three data signals. Referring to FIG. 7, the first criterion is satisfied when the total combined transmit power of the three data signals reaches $P_2$, at time $t_7$ in FIG. 7. At this point, the transmit power of the highest-powered of the three data signals is reduced to zero, with the result that the total combined transmit power of the data signals falls to $P_1$. The quality of the first channel 160 continues to deteriorate, until the combined transmit power of the two transmitted data signals reaches $P_2'$, at time $t_8$ in FIG. 7. At this point, the transmit power of the highest-powered of the remaining two data signals is also reduced to zero, with the result that the total combined transmit power of the data signals falls to $P_1'$. The quality of the first channel 160 then continued to deteriorate still further, until the transmit power of the remaining transmitted data signal reaches $P_s''$, at time $t_9$ in FIG. 7. At this point, the transmit power of the third data signal is also reduced to zero, with the result that the total combined transmit power of the data signals falls to $P_1''$, where $P_1''=0$. When the quality of the first channel 160 improves, the transmit power of all the data signals may be increased at the same time when the second criterion is considered to be met, or the second criterion may be applied a plurality of times with the power of a different data signal or plurality of data signals being increased each time the second criterion is met; in this latter case, the order in which the transmit powers of the multiple data signals are increased does not necessarily have to be the same as or the reverse of the order in which the transmit powers of the multiple data signals were reduced. In FIG. 7, the transmit power of one each of the three data signals is increased at respective times $t_{10}$, $t_{11}$ and $t_{12}$; the power levels at which the transmit power of the data signals are increased are shown to be the same as the power levels $P_2$, $P_2'$, and $P_2''$ at which the transmit powers were decreased, but this is not essential.

During operation of the first radio station 100 after decreasing the transmit power following the first criterion being met, and before the second criterion is met, any control signal transmitted by the first station 100 may be either a) switched off, or b) continued with varying power to continue to track the changes in channel quality to some extent, or c) continued at a constant level.

The second criterion, for determining when to increase the transmit power and if appropriate resume the full tracking of the variations in channel quality by the transmit power level, may take one of several forms. Some examples are as follows:

a) the quality of a signal received on the second channel 260 exceeds a predetermined level (this may be particularly relevant if open-loop power control is used);

b) the quality of the first channel 160 exceeds a predetermined level as indicated by a message received on the second channel 260;

c) if a control signal is transmitted with varying power to continue to track the changes in channel quality while the transmit power of the data is decreased, increase the transmit power of the data when the control signal power falls to or below its value when the first criterion was met;

c) if a control signal is transmitted at a constant level while the transmit power of the data is decreased, increase the transmit power of the data on receipt of a TPC command to decrease transmit power or on receipt of a predetermined number of TPC commands to decrease transmit power within a further predetermined time period. In this latter case, while the prevailing channel quality is poor and the second criterion is not met, the second radio station 200 will, based on quality measurements on the control to signal transmitted by the first radio station 100, transmit TPC commands requesting the first radio station 100 to increase its transmit power level, which the first radio station will not obey. During this period the second radio station 200 may reduce the rate at which the TPC commands are transmitted.

The choice of power level $P_2$ is typically a compromise between increasing power efficiency plus system efficiency, and maintaining the ability for the second radio station 200 to decode the data block despite the periods $t_1$ to $t_2$, $t_3$ to $t_4$, and $t_5$ to $t_6$ of poor or zero reception of the data while the data transmit power of the first radio station 100 is decreased or zero. If the first radio station transmits a plurality of data signals simultaneously as described above and the second criterion is applied a plurality of times during the predetermined time period, the order in which the second criterion is applied to the different data signals may depend on factors such as the number of bits remaining to be transmitted in each data signal, the relative priority of each data signal, the transmit power required by each data signal or the relative times at which the first criterion was applied to each of the data signals.

Some options for transmission of the data block are described below with reference to FIG. 5. FIGS. 5A to 5F illustrate the time relationship of the data block with respect to the variations in channel quality in FIG. 5G, reproduced from FIG. 2.

Figure 5B:
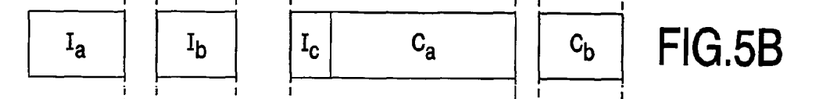

A first option for transmission of the data block is to continue transmission uninterrupted despite the decreases in data transmit power to level $P_1$. Such a scheme is illustrated in FIG. 5B which shows the information symbol portions $I_a$, $I_b$, $I_c$ of the data block and the parity check symbol portions $C_a$, $C_b$ of the data block which are received by the second radio station 200. The symbols transmitted during the periods $t_1$ to $t_2$, $t_3$ to $t_4$, and $t_5$ to $t_6$ are not likely to be received successfully by the second radio station 200, but, depending on the error correction capability of the parity check symbols, the missing portions of information symbols may recoverable by error correction. Alternatively or in addition to error correction, a retransmission protocol may be used to receive missing portions of the information symbols.

A second option for transmission of the data block is to suspend transmission of the data block symbols during the periods $t_1$ to $t_2$, $t_3$ to $t_4$, and $t_5$ to $t_6$ while maintaining the timing of the symbols of the data block relative to the time period 0 to $t_F$. After each period of suspension the transmission of the data block symbols resumes from the portion of the data block corresponding to the non-elapsed portion of the time period 0 to $t_F$. This is equivalent to the first option but with $P_1=0$, so the symbols received successfully by the second radio station 200 are the same ones as in the first option described above and illustrated in FIG. 5B.

Figure 5C:
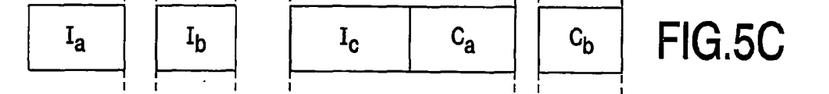

A third option for transmission of the data block is to suspend transmission of the data block symbols during the periods $t_1$ to $t_2$, $t_3$ to $t_4$, and $t_5$ to $t_6$ but, when the data transmit power is increased following the second criterion being met, to resume transmission of the data block from the point of suspension. Such a scheme is illustrated in FIG. 5C which shows that all of the information symbols are now transmitted, spaced out over three portions $I_a$, $I_b$, $I_c$. The start of transmission of the parity check symbols is delayed and the parity symbol portions $C_a$, $C_b$ are too short to enable all of the parity check symbols C to be transmitted, so the excess parity check symbols that cannot be transmitted before the expiry of the time period $t_F$ are not transmitted. This truncation of the data block corresponds to puncturing the parity check symbols C and results in a reduction in the error correcting capability within the data block. However, because all of the information symbols have been transmitted while the channel quality is good, the reduced error correcting capability may be sufficient to recover all the information symbols.

In a variation of the third option, the transmitting means 110 may, at a point during the predetermined time period, adopt uninterrupted transmission at an increased power level of the information symbols or of the information symbols and at least a portion of the parity check symbols, irrespective of the second criterion being met. This scheme may be adopted if, for example, subsequent suspension of transmission of the data block would result in truncation of the information symbols or parity check symbols by the end of the predetermined time period.

Figure 5D:
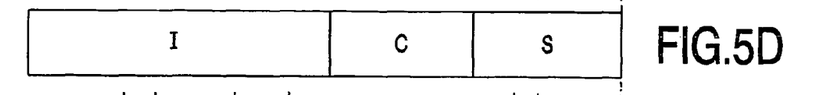
Figure 5E:
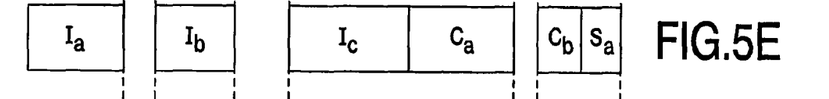

In a fourth option the data block comprises information symbols I and parity check symbols C and there is spare capacity within the predetermined time period available for transmitting the data block. Such a data block is illustrated in FIG. 5D in which the spare capacity is labelled S. Transmission of this data block is illustrated in FIG. 5E. As in the third option described above, transmission of the data block is suspended during the periods $t_1$ to $t_2$, $t_3$ to $t_4$, and $t_5$ to $t_6$ while the data transmit power is decreased at times $t_1$, $t_3$ and $t_5$, and when the data transmit power is increased following the second criterion being met transmission of the data block resumes from the point of suspension. As in the third option, all of the information symbols are transmitted, spaced out over three portions $I_a$, $I_b$, $I_c$, and the start of transmission of the parity check symbols C is delayed, but in this option all of the parity check symbols C are transmitted in portions $C_a$, $C_b$ using a portion of the spare capacity S. As illustrated in FIG. 5E, only a portion $S_a$ of the spare capacity S remains after transmission of all of the information I and parity check symbols C. In this case the second radio station 200 may apply the full error correcting capability of the parity check symbols C to the received information symbols I. As a numerical example, there may be 100 information bits, 50 parity check bits, and spare capacity for up to a further 50 symbols.

In a variation of the fourth option, the portion $S_a$ of the spare capacity S is used for retransmitting information and/or parity check symbols that have been transmitted earlier in the data block. This option can increase the reliability of successful decoding of the information symbols I.

In a further variation of the fourth option, the portion $S_a$ of the spare capacity S is not used for retransmission of data but instead the transmit power is reduced, or transmission is suspended, during the portion $S_a$, thereby further saving power and reducing interference.

Figures 5F, 5G:
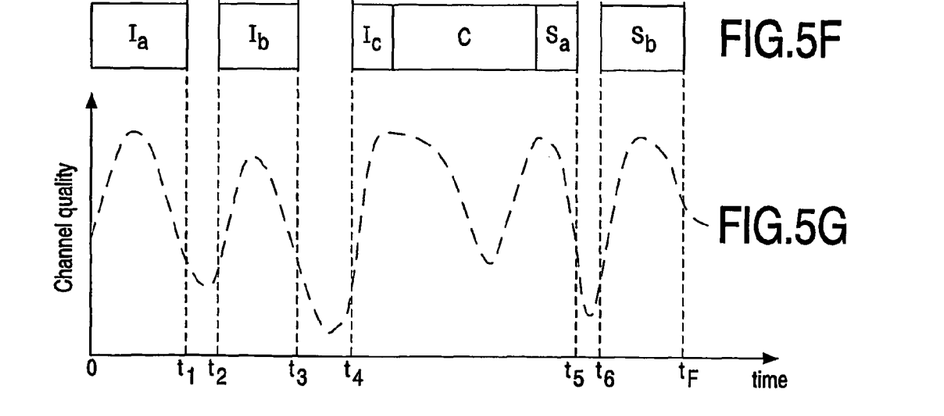

In a fifth option the data block, as in the fourth option, comprises information symbols I and parity check symbols C and there is spare capacity within the predetermined time period available for transmitting the data block, as illustrated in FIG. 5D in which the spare capacity is labelled S. Transmission of this data block is illustrated in FIG. 5F. As in the second option described above, transmission of the data block symbols is suspended during the periods $t_1$ to $t_2$, $t_3$ to $t_4$, and $t_5$ to $t_6$ while maintaining the timing of the symbols of the data block relative to the time period 0 to $t_F$, and after each period of suspension the transmission of the data block symbols resumes from the portion of the data block corresponding to the non-elapsed portion of the time period 0 to $t_F$. The portions $S_a$ and $S_b$ of the spare capacity S during which transmission is not suspended are used for transmitting information and/or parity check symbols which were not transmitted due to suspension of transmission earlier in the predetermined time period.

Figure 6:
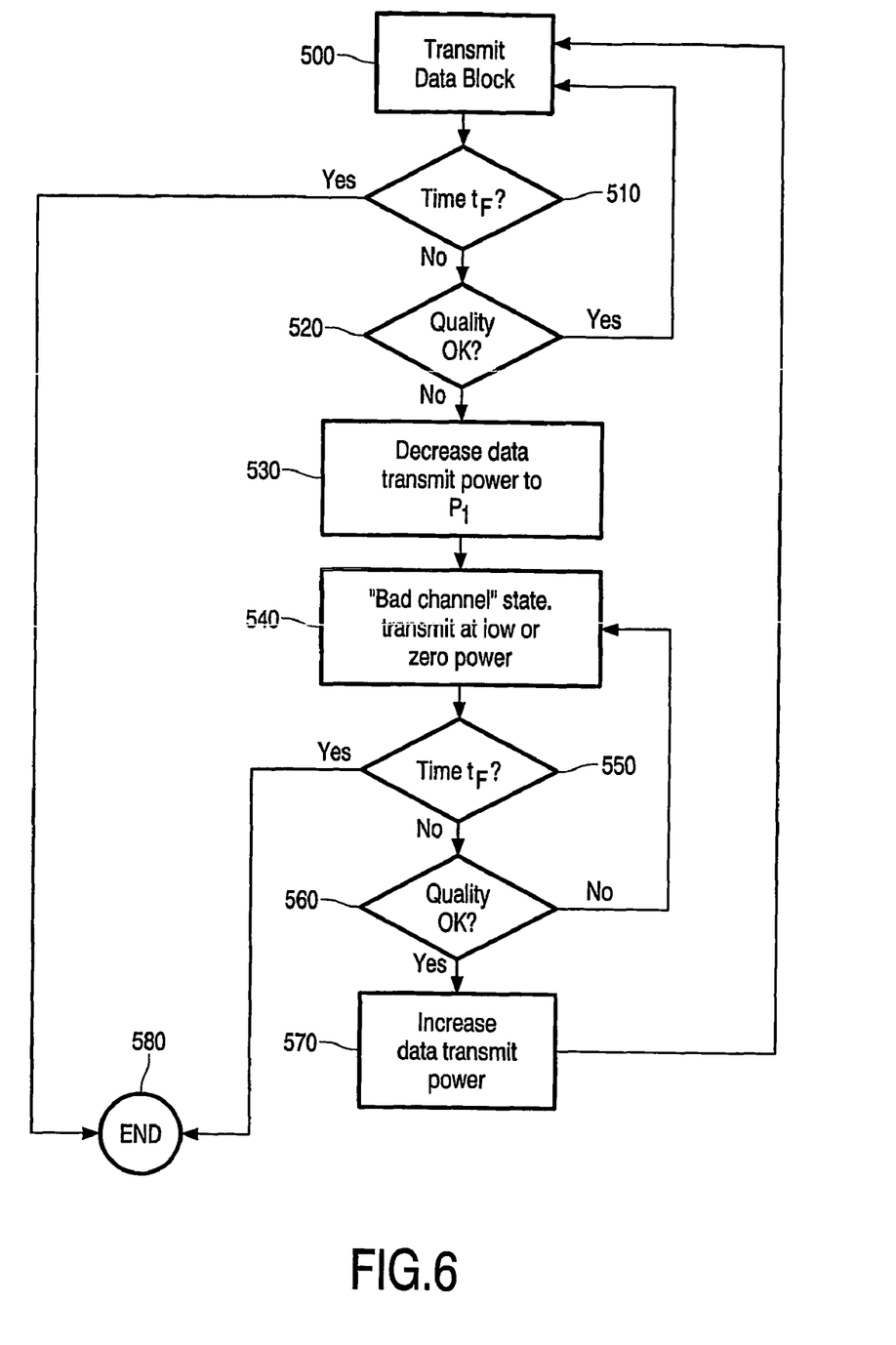
FIG. 6 is a flow chart illustrating a method of operation in accordance with the invention.

FIG. 6 is a flow chart illustrating a method of operating a radio communication system 300 in accordance with the invention. Transmission of the data block by the first radio station 100 commences at time t=0 at block 500. At block 510 the first radio station 100 tests whether the time $t_F$ at which the predetermined time period expires has been reached. It time $t_F$ has been reached flow proceeds to block 580 where transmission of the data block ends. If the time $t_F$ has not been reached flow proceeds to block 520 where the first radio station 100 tests whether the channel quality has reduced according to the first criterion. If it has not the transmission of the data block continues at block 500 and the transmit power control may be adjusted to track any change in channel quality. If the channel quality has reduced according to the first criterion, flow proceeds to block 530 where the data transmit power is decreased, and flow continues to block 540 where the first radio station 100 is in a "bad channel" state and transmissions are at low or zero power. Flow then proceeds to block 550 where the first radio station 100 again tests whether the time $t_F$ at which the predetermined time period expires has been reached. It time $t_F$ has been reached flow proceeds to block 580 where transmission of the data block ends. If the time $t_F$ has not been reached flow proceeds to block 560 where the first radio station 100 tests whether the channel quality has increased according to the second criterion. If it has not flow returns to block 540, and if it has flow proceeds to block 570 where the data block transmit power is increased and flow returns to block 500 where transmission of the data block continues and the tracking of the channel quality by the transmit power continues.

Optionally, the first radio station 100 may transmit information which will assist the second radio station 200 in recovering the information symbols I. Such information may include, for example: an indication of which symbols of the data block have not been transmitted or were transmitted while the transmit power was decreased; an indication of the times $t_1$, $t_2$, $t_3$, $t_4$, $t_5$ and $t_6$; an indication of the points of suspension and resumption of transmission of the data block; an indication of to what extent the data block has been truncated; and an indication of which symbols have been retransmitted. This information could be transmitted, for example, at regular intervals and may be included within each data block.

Optionally, the first radio station 100 may transmit an indication of whether transmission of the data block is in progress or suspended. Such an indication may be, for example, different control signals which may be orthogonal pilot signals. The second radio station may transmit a first indication of received signal quality, such as TPC commands, while it receives the indication that transmission of the data block is in progress, and while it receives an indication that transmission of the data block is suspended it may transmit a different indication of received signal quality.

In one embodiment of the invention in a Time Division Multiple Access (TDMA) system, the transmission and reception by a radio station alternates rather than taking place concurrently, and the data and any control signal could be transmitted at the same power level.

In another embodiment of the invention in a Code Division Multiple Access (CDMA) system, there may be more than one data signal transmitted simultaneously from the first radio station 100 and the power control may be applied to the different data signals independently or to more than one data signal in unison.

In a further embodiment of the invention in a multicarrier system, the data block is transmitted on a plurality of data signals on a plurality of frequency domain carriers simultaneously. In this case the channel quality may be measured independently for each carrier or a plurality of carriers and the transmit power level set accordingly for one or more of the carriers. The transmit power of the data on some carriers would be reduced to a low value or switched off if the channel quality on those carriers were poor, while transmission continued at a higher power level on other carriers.

Such a multicarrier system may be combined with the time-domain implementation described above. In this case, the transmit power of the data on each carrier may be reduced or increased during the pre-determined time period according to variations in channel quality on each carrier.

In a multicarrier system, the missing portions of information symbols arising from the data transmit power being low or zero on some carriers may be recoverable by error correction depending on the error correction capability of the parity check symbols. Alternatively or in addition to error correction, a retransmission protocol may be used to receive missing portions of the information symbols.

In one embodiment of the invention in a multicarrier system, the data block comprises information symbols/and parity check symbols C and there are provided more carriers than are required for transmitting the data block within the predetermined time period. The additional carriers may for example be used to transmit the data bits which are transmitted with low or zero power on other carriers which have poor channel quality.

In the example illustrated in FIG. 4, the first criterion is met when the channel quality falls below a predetermined level, and the second criterion is met when the channel quality increases above the same predetermined level. However these two levels need not be identical.

It is not essential that the data transmit power level $P_1$ is the same at times $t_1$, $t_3$, and $t_5$ nor that the data block transmit power is held constant during the periods $t_1$ to $t_2$, $t_3$ to $t_4$, and $t_5$ to $t_6$.

The data block may comprise other symbols in addition to information and parity check symbols, for example symbols for synchronisation. In the present specification and claims the word "a" or "an" preceding an element does not exclude the presence of a plurality of such elements. Further, the word "comprising" does not exclude the presence of other elements or steps than those listed.

The inclusion of reference signs in parentheses in the claims is intended to aid understanding and is not intended to be limiting.

From reading the present disclosure, other modifications will be apparent to persons skilled in the art. Such modifications may involve other features which are already known in the art of radio communication and the art of transmitter power control and which may be used instead of or in addition to features already described herein.

The invention claimed is:

1. A radio station comprising transmitter means for transmitting over a channel in a predetermined time period (0 to $t_F$) a data block comprising
   information symbols (I) and parity check symbols (C);
   receiving means for receiving a Transmitter Power Control (TPC) command indicating either a reduction or an increase in channel quality; and
   control means responsive to the indication of a reduction in channel quality according to a first criterion for decreasing the data transmit power and responsive to the indication within the predetermined time period of an increase in channel quality according to a second criterion for increasing the data transmit power;
   wherein the radio station transmits multiple data signals simultaneously so that data transmit power variation occurs on a subset of the multiple data signals.

2. The radio station as claimed in claim 1, wherein the transmitter means is adapted to suspend transmission of the data block in response to the indication of a reduction in channel quality according to the first criterion and to resume transmission of the data block in response to the increase in channel quality according to the second criterion.

3. The radio station as claimed in claim 2, wherein the resumption proceeds from the portion of the data block corresponding to the unexpired portion of the predetermined period.

4. The radio station as claimed in claim 2, wherein the resumption proceeds from the point of suspension of the data block and the data block is truncated if the predetermined time period expires before the whole of the data block is transmitted.

5. The radio station as claimed in claim 4, wherein the transmitter means is adapted to transmit at least some of the parity check symbols (C) after transmitting all of the information symbols (I).

6. The radio station as claimed in claim 2, wherein the transmitter means is further adapted to transmit an indication of what portion of the data block the resumption proceeds from.

7. The radio station as claimed in claim 2, wherein the transmitter means is further adapted to, in response to completing transmission of the information (I) and parity check symbols (C) before the end of the predetermined time period ($t_F$), retransmit at least a portion of the information or parity check symbols within the predetermined time period.

8. The radio station as claimed in claim 2, wherein the transmitter means is further adapted to resume transmission of the data block if the unexpired portion of the predetermined time period ceases to exceed the time required to complete transmission of at least the information symbols (I).

9. The radio station as claimed in claim 1, wherein the indication of a reduction in channel quality according to the first criterion is an indication to increase transmit power above a predetermined threshold ($P_2$).

10. The radio station as claimed in claim 9, wherein the indication to increase transmit power is a received command.

11. The radio station as claimed in claim 9, wherein the indication to increase transmit power is a measurement of reduced channel quality on a received signal.

12. The radio station as claimed in claim 1, wherein the transmitter means is further adapted to, in the time period between the first criterion being met and the second criterion being met, transmit a control signal at a variable transmit power responsive to received power control commands, and wherein the second criterion is the transmit power of the control signal becoming equal to or less than the transmit power of the control signal when the first criterion was met.

13. The radio station as claimed in claim 1, wherein the transmitter means is further adapted to, in the time period between the first criterion being met and the second criterion being met, transmit a control signal at a constant power level, and wherein the second criterion is a received command to reduce transmit power.

14. The radio station as claimed in claim 13, wherein the second criterion is a predetermined number of commands to reduce power received within a further predetermined time period.

15. The radio station as claimed in claim 1, wherein the increase in channel quality according to the second criterion is an increase in channel quality above a predetermined level measured on a received signal.

16. The radio station as claimed in claim 2, wherein the transmitter means is adapted to transmit an indication of whether transmission of the data block is in progress or suspended.

17. Radio station as claimed in claim 16, wherein the indication of whether transmission of the data block is in progress or suspended comprises a first control signal when transmission of the data block is in progress, and a second control signal when transmission of the data block is suspended.

18. The radio station as claimed in claim 1, wherein the decrease in the data transmit power is a decrease to zero transmit power.

19. The radio station as claimed in claim 1, wherein the decrease in data transmit power takes place at least on the highest powered data signal.

20. The radio station as claimed in claim 1, wherein the plurality of data signals are transmitted on a plurality of carrier frequencies.

21. The radio station for use in a radio communication system comprising at least one radio station as claimed in claim 1, comprising quality assessment means for assessing the quality of received signals, means for determining whether transmission of a data block is in progress or suspended, and transmitter means for transmitting a first indication of received signal quality while transmission of the data block is in progress and for transmitting a second indication of received signal quality while transmission of the data block is suspended.

22. A radio communication system comprising at least one radio station as claimed in claim 1.

23. A method of operating a radio communication system, comprising,
    at a first radio station, transmitting over a channel in a predetermined time period to a second radio station a data block comprising information symbols (I) and parity check symbols (C),
    receiving a Transmitter Power Control (TPC) command indicating either a reduction or an increase in channel quality; and
    in response to the indication of a reduction in channel quality according to a first criterion, decreasing the data transmit power and,
    in response to the indication within the predetermined time period of an increase in channel quality according to a second criterion, increasing the data transmit power;
    wherein the radio station transmits multiple data signals simultaneously so that data transmit power variation occurs on a subset of the multiple data signals.

24. The method as claimed in claim 23, further comprising suspending transmission of the data block in response to the indication of a reduction in channel quality according to the first criterion and resuming transmission of the data block in response to the indication within the predetermined time period of an increase in channel quality according to the second criterion.

25. The method as claimed in claim 24, wherein the resumption proceeds from the portion of the data block corresponding to the unexpired portion of the predetermined period.

26. The method as claimed in claim 24, wherein the resumption proceeds from the point of suspension of the data block the data block is truncated if the predetermined time period expires before the whole of the data block is transmitted.

27. The method as claimed in claim 26, further comprising transmitting at least some of the parity check symbols after transmitting all of the information symbols (I).

28. The method as claimed in claim 24, further comprising transmitting an indication of what portion of the data block the resumption proceeds from.

29. The method as claimed in claim 25, further comprising, in response to completing transmission of the information and parity check symbols (I, C) ore the end of the predetermined time period, retransmitting at least a portion of the information or parity check symbols within the predetermined time period.

30. The method as claimed in claim 24, further comprising resuming transmission of the data block if the unexpired portion of the predetermined time period ceases to exceed the time required to complete transmission of at least the information symbols (I).

31. The method as claimed in claim 23, wherein the indication of a reduction in channel quality according to the first criterion is an indication to increase transmit power above a predetermined threshold ($P_2$).

32. The method as claimed in claim 31, wherein the indication to increase transmit power is a received command.

33. The method as claimed in claim 31, wherein the indication to increase transmit power is a measurement of reduced channel quality on a received signal.

34. The method as claimed in claim 23, further comprising transmitting in the time period between the first criterion being met and the second criterion being met a control signal at a variable transmit power responsive to received power control commands, and wherein the second criterion is the transmit power of the control signal becoming equal to or less than the transmit power of the control signal when the first criterion was met.

35. The method as claimed in claim 23, further comprising transmitting in the time method between the first criterion being met and the second criterion being met a control signal at a constant transmit power level, and wherein the second criterion is a received command to reduce transmit power.

36. The method as claimed in claim 23, wherein the indication of an increase in channel quality according to the second criterion is an increase in channel quality measured on a received signal.

37. The method as claimed in claim 24, further comprising transmitting an indication of whether transmission of the data block is in progress or suspended.

38. The method as claimed in claim 37, wherein the indication of whether transmission of the data block is in progress suspended comprises a first control signal when transmission of data block is in progress, and a second control signal when transmission of the data block is suspended.

39. The method as claimed in claim 23, wherein the decreasing of the transmit power is a decrease to zero transmit power.

40. The method as claimed in claim 23, wherein the decrease in data transmit power takes place at least on the highest powered data signal.

41. The method as claimed in claim 23, wherein the plurality of data signals are transmitted on a plurality of carrier frequencies.

42. The method as claimed in claim 24, further comprising, at the second radio station, assessing the quality of received signals, determining whether transmission of a data block is in progress or suspended, and transmitting a first indication of received signal quality while transmission of the data block is in progress and for transmitting a second indication of received signal quality while transmission of the data block is suspended.

* * * * *